(12) United States Patent
Mangtani et al.

(10) Patent No.: US 9,538,601 B1
(45) Date of Patent: Jan. 3, 2017

(54) METHOD AND APPARATUS FOR DRIVING LOADS USING A DC-DC CONVERTER

(71) Applicant: Allegro Microsystems, LLC, Worcester, MA (US)

(72) Inventors: Vijay Mangtani, Nashua, NH (US); Nai-Chi Lee, Nashua, NH (US)

(73) Assignee: ALLEGRO MICROSYSTEMS, LLC, Worcester, MA (US)

( * ) Notice: Subject to any disclaimer, the term of this patent is extended or adjusted under 35 U.S.C. 154(b) by 0 days.

(21) Appl. No.: 14/878,274

(22) Filed: Oct. 8, 2015

(51) Int. Cl.
H05B 33/08 (2006.01)
H02J 1/00 (2006.01)
H02M 3/156 (2006.01)

(52) U.S. Cl.
CPC ............. *H05B 33/0854* (2013.01); *H02J 1/00* (2013.01); *H02M 3/156* (2013.01); *H05B 33/0815* (2013.01)

(58) Field of Classification Search
None
See application file for complete search history.

(56) References Cited

U.S. PATENT DOCUMENTS

| | | | |
|---|---|---|---|
| 7,675,245 B2 | 3/2010 | Szczeszynski et al. | |
| 7,999,487 B2 | 8/2011 | Szczeszynski | |
| 8,169,161 B2 | 5/2012 | Szczeszynski et al. | |
| 8,274,238 B2 | 9/2012 | Szczeszynski et al. | |
| 8,482,225 B2 | 7/2013 | Szczeszynski | |
| 8,610,371 B2 | 12/2013 | Lee et al. | |
| 8,629,619 B2 * | 1/2014 | Clauberg | H05B 33/0815 315/119 |
| 8,653,756 B2 | 2/2014 | Szczeszynski et al. | |
| 8,692,482 B2 | 4/2014 | Szczeszynski et al. | |
| 8,957,607 B2 | 2/2015 | Raval et al. | |
| 8,994,279 B2 | 3/2015 | Raval et al. | |
| 9,007,000 B2 | 4/2015 | Szczeszynski et al. | |
| 9,144,126 B2 | 9/2015 | Raval et al. | |
| 9,155,156 B2 | 10/2015 | Szczeszynski | |
| 2013/0009556 A1 | 1/2013 | Szczeszynski et al. | |
| 2013/0038234 A1* | 2/2013 | Van Der Veen | H05B 33/083 315/224 |
| 2014/0176018 A1 | 6/2014 | Szczeszynski et al. | |
| 2015/0061528 A1 | 3/2015 | Raval et al. | |
| 2015/0181671 A1 | 6/2015 | Szczeszynski et al. | |
| 2015/0244353 A1 | 8/2015 | Humphrey et al. | |

OTHER PUBLICATIONS

Datasheet of Allegro Microsystems, LLC for A6213 "Automotive Grade, Constant-Current 3-Ampere PWM Dimmable Buck Regulator LED Driver", 2012, 17 pages.
Datasheet of Texas Instruments for LM3409 "PFET Buck Controller for High Power LED Drivers", Mar. 2009, 44 pages.

(Continued)

*Primary Examiner* — Dedei K Hammond
(74) *Attorney, Agent, or Firm* — Daly, Crowley, Mofford & Durkee, LLP

(57) ABSTRACT

A driver circuit for driving one or more loads in a controlled manner includes multiple operational modes. In one mode, bypass switching may be used to adjust a drive signal applied to the one or more loads. In another mode, a DC-DC converter may be used to adjust the drive signal applied to the one or more loads. In at least one embodiment, the driver circuit is a light emitting diode driver circuit.

14 Claims, 3 Drawing Sheets

(56) References Cited

OTHER PUBLICATIONS

Datasheet of Texas Instruments for TPS92661-Q1 "High-Brightness LED Matrix Manager for Automotive Headlight System" Sep. 2014, 53 pages.
U.S. Appl. No. 62/103,190, filed Jan. 14, 2015; 34 pages.
U.S. Appl. No. 14/620,656, filed Feb. 12, 2015; 26 pages.
U.S. Appl. No. 14/677,029, filed Apr. 2, 2015; 19 pages.
U.S. Appl. No. 62/174,847, filed Jun. 12, 2015; 21 pages.

* cited by examiner

METHOD AND APPARATUS FOR DRIVING LOADS USING A DC-DC CONVERTER

FIELD

Subject matter disclosed herein relates generally to electronic circuits and, more particularly, to techniques, circuits, and systems for driving electrical loads at controllable drive levels.

BACKGROUND

Electronic driver circuits are often called upon to drive electrical loads in a controlled manner in order to achieve a variable result. As one example, DC-DC switching converters (e.g., a buck converter, etc.) are often used to drive a light emitting diode (LED) load. The LED brightness is directly proportional to the current through the LED.

One type of converter sometimes used to drive an LED load is a current regulator that maintains a constant current output by using the output inductor as a current-regulating element. This regulator type eliminates the need for a large output capacitor as is generally required in voltage regulators, thereby reducing component cost and circuit board space requirements. However, one drawback of using the output inductor as a current-regulating element is that the inductor current cannot be turned on and off instantaneously.

A commonly used technique for adjusting LED brightness is the use of a pulse width modulation (PWM) signal. The LED current ramps up to a regulation target when the PWM signal is high and ramps down when the PWM signal goes low. Due to the finite current slope through the output inductor, the average current cannot be precisely controlled. The error gets larger as the PWM duty cycle gets lower. Therefore, another technique may be applied to achieve fast turn on and turn off of the LED current. One such, technique is to use a bypass switch in parallel with the LED string. The bypass switch acts as a current shunt to steer the inductor current away from the LED load such that the voltage across the LED string drops instantaneously from Vf (i.e., the forward voltage across the LED string) to nearly zero volts. The average inductor current remains unchanged, while the switch duty cycle is reduced to account for the lower output voltage.

SUMMARY

In accordance with one aspect of the concepts, systems, circuits, and techniques described herein, a driver circuit is provided for driving one or more loads in a controlled manner. More specifically, the driver circuit comprises a multi-mode controller to control operation of the driver circuit, the multi-mode controller being capable of operating the driver circuit in a first mode or a second mode based on a parameter value, wherein operation under the first mode includes using a DC-DC converter to adjust a drive signal applied to the one or more loads and operation under the second mode includes using bypass switching to adjust the drive signal applied to the one or more loads, wherein bypass switching includes controllably shunting drive current to a reference node in a manner that bypasses the one or more loads.

In one embodiment, the driver circuit further comprises: at least one node for coupling to the one or more loads during driver operation and a bypass switch coupled to the at least one node for use in bypass switching, the bypass switch having an input to receive a switching control signal.

In one embodiment, the driver circuit further comprises a bypass controller coupled to the input of the bypass switch, the bypass controller to generate the switching control signal for the bypass switch if the driver circuit is in the second mode.

In one embodiment, the bypass controller includes an enable input for use in enabling and disabling the bypass controller, wherein the multi-mode controller is configured to disable the bypass controller if the driver circuit is in the first mode.

In one embodiment, the driver circuit further comprises a DC-DC converter controller to control a duty cycle of the DC-DC switching converter based, at least in part, on a control signal from the multi-mode controller.

In one embodiment, the DC-DC converter controller is to control the duty cycle of the DC-DC switching converter based, at least in part, on the control signal from the multi-mode controller and feedback from the one or more loads.

In one embodiment, the driver circuit further comprises a sense resistor for coupling between the one or more loads and a reference potential during driver operation, the sense resistor being coupled to an input of the DC-DC converter controller to provide feedback thereto for use in adjusting the duty cycle of the DC-DC switching converter.

In one embodiment, the DC-DC converter is a buck converter.

In one embodiment, the driver circuit is implemented as an integrated circuit, and the at least one node includes at least one contact on the integrated circuit, wherein the integrated circuit further comprises at least one contact for connection to an external DC-DC converter.

In one embodiment, the driver circuit includes a light emitting diode (LED) driver circuit and the one or more loads include LEDs.

In one embodiment, the parameter value is a desired brightness for the one or more LEDs and the multi-mode controller is configured to operate the driver circuit in the first mode if the desired brightness is above, a threshold level and in the second mode if the desired brightness is below the threshold level.

In one embodiment, the multi-mode controller is configured to adjust the brightness of the one or more LEDs by adjusting a duty cycle of the DC-DC converter if the driver system is in the first mode and by turning a bypass switch on and off if the driver system is in the second mode.

In accordance with another aspect of the concepts, systems, circuits, and techniques described herein, a method is provided for driving one or more loads in a controlled manner. More specifically, the method comprises: adjusting a drive signal applied to the one or more loads by varying a duty cycle associated with a DC-DC converter if a first condition is satisfied and adjusting the drive signal applied to the one or more loads using bypass switching if the first condition is not satisfied, wherein bypass switching includes controllably shunting drive current away from the one or more loads.

In one embodiment, the first condition includes a desired output characteristic of the one or more loads being greater than a threshold value.

In one embodiment, the one or more loads include light emitting diodes and the first condition includes a desired brightness of the one or more loads being greater than a threshold value.

In one embodiment, adjusting the drive signal applied to the one or more loads using bypass switching includes sending a control signal to a bypass switch that is connected in parallel with the one or more loads to turn the bypass switch on and off in a predetermined manner.

In accordance with still another aspect of the concepts, systems, circuits, and techniques described herein, a method is provided for operating a driver circuit for driving one or more loads in a controlled manner. More specifically, the method comprises: operating the driver circuit in a first mode if a first condition is satisfied, wherein the first mode includes adjusting a drive signal applied to the one or more loads by varying a duty cycle associated with a DC-DC converter and operating the driver circuit in a second mode if the first condition is not satisfied, wherein the second mode includes adjusting the drive signal applied to the one or more loads using bypass switching, wherein bypass switching includes controllably shunting drive current away from the one or more loads, wherein bypass switching is not used when the driver circuit is being operated in the first mode.

In one embodiment, the first condition includes a desired output characteristic of the one or more loads being greater than a threshold value.

In one embodiment, the one or more loads include light emitting diodes; and the first condition includes a desired brightness of the one or more loads being greater than a threshold value.

In one embodiment, operating the driver circuit in the first mode includes disabling a bypass controller.

In accordance with a further aspect of the concepts, systems, circuits, and techniques described herein, a light emitting diode (LED) driver circuit is provided to drive one or more LED loads in a controlled manner. More specifically, the LED driver circuit comprises: a DC-DC converter controller to control a duty cycle of a DC-DC converter to be coupled to the one or more LED loads, a bypass switch to controllably shunt drive current to a reference node in a manner that bypasses the one or more LED loads, the bypass switch having an input to receive a switching control signal, a bypass controller coupled to the input of the bypass switch to generate the switching control signal, and a multi-mode controller to control operation of the LED driver circuit, the multi-mode controller to operate the LED driver circuit in accordance with a first mode when a desired light intensity of the one or more LED loads is greater than a threshold value and to operate the LED driver circuit in accordance with a second mode when the desired light intensity of the one or more LED loads is less than the threshold value, wherein the second mode uses the bypass switch to adjust a drive signal applied to the one or more LED loads and the first mode does not.

In one embodiment, the bypass controller is configured to generate the switching control signal for the bypass switch when the LED driver circuit is in the second mode and the bypass controller is disabled when the driver circuit is in the first mode.

In one embodiment, the DC-DC converter includes a buck converter and the DC-DC converter controller includes a buck controller.

In one embodiment, the LED driver circuit further comprises a sense resistor to be coupled between the one or more LED loads and a node carrying a reference potential during LED driver operation, the sense resistor being coupled to an input of the DC-DC converter controller to provide, feedback to the controller for use in controlling the duty cycle of the DC-DC converter.

In one embodiment, the LED driver circuit is implemented as an integrated circuit that includes at least one contact for connection to an external DC-DC converter.

BRIEF DESCRIPTION OF THE DRAWINGS

The foregoing features may be more fully understood from the following description of the drawings in which.

DETAILED DESCRIPTION

Techniques and systems described herein relate to a dual mode driver system that uses a DC-DC converter to drive one or more loads (e.g., LEDs, etc.) in a controlled manner. The driver system uses a first mode to drive the loads during higher duty cycle operation and a second mode to drive the loads during lower duty cycle operation. The first mode uses conventional DC-DC converter techniques to adjust an output characteristic associated with the load(s) (e.g., light intensity of LED loads, etc.). The second mode makes use of bypass switching techniques to adjust the output characteristic of the load(s). As will be described in greater detail, use of bypass switching enables high dimming duty cycles (or low brightness levels) to be achieved in an LED driver system. By limiting the use of bypass switching to low duty cycle (or low brightness) operation, driver efficiency may be increased. Although described below in the context of LED driver systems, it should be understood that, in some embodiments, dual mode driver operation using bypass switching is used with other types of driver systems.

In various locations within the description below, duty cycles are discussed. To avoid confusion, it should be mentioned that two different types of duty cycles are generally described. One type of duty cycle is the duty cycle of the DC-DC converter (i.e., the buck converter duty cycle) which generally sets the output voltage level of the converter and is established by the ratio of the converter output voltage to the input voltage. The other type of duty cycle may be referred to as a dimming duty cycle of the LED load 12 and directly affects the LED brightness.

Figure 1:
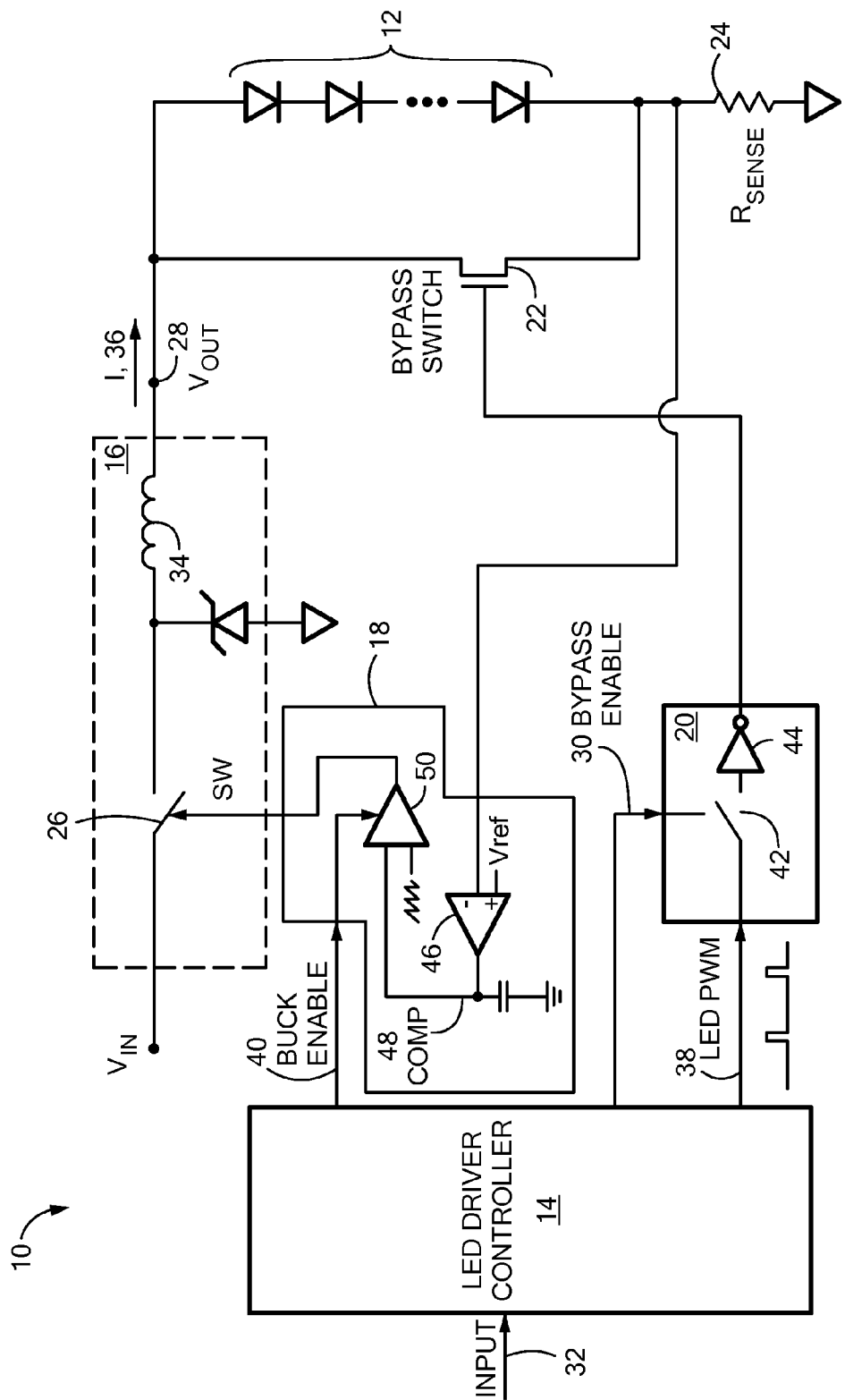
FIG. 1 is a block diagram illustrating a light emitting diode (LED) driver system in accordance with an embodiment.

FIG. 1 is a block diagram illustrating a light emitting diode (LED) driver system 10 in accordance with an embodiment. The LED driver system 10 may be used to drive one or more LED load devices 12 coupled to an output thereof to achieve, for example, a variable light intensity level. As shown, the LED driver system 10 may include: an LED driver controller 14, a buck converter 16, a buck controller 18, a bypass controller 20, a bypass switch 22, and a sense resistor 24. The LED driver controller 14 is operative for controlling the overall operation of the LED driver system 10. The buck converter 16 is a DC-DC switching converter that is operative for converting an input voltage $V_{IN}$ to an output voltage $V_{OUT}$ on an output node 28 at which a regulated output current I, 36 is provided for use in driving the LED load(s) 12. The level of the output current 36 of buck converter 16 can be varied by changing a buck converter duty cycle (i.e., the duty cycle associated with the converter switch 26). The level of the current through the LED load(s) 12 controls the LED brightness or light intensity.

The buck controller 18 is operative for setting the buck converter duty cycle of the buck converter switch 26 to achieve a desired output drive level. The buck controller 18 does this by generating a switching signal SW for the buck converter 16 that is delivered to the converter switch 26. The basic operating principles of a buck converter are well known in the art and, therefore, will not be described herein. In general, at higher buck converter duty cycles, the buck converter 16 will drive the LED load(s) with more current, resulting in higher light intensity (i.e., lower dimming duty cycle). At lower buck converter duty cycles, the buck converter 16 will drive the LED load(s) with less current, resulting in lower light intensity (i.e., higher dimming duty cycle).

As shown in FIG. 1, the buck controller 18 may operate under the control of the LED driver controller 14. For example, the LED driver controller 14 may send a buck enable signal 40 to the buck controller 18 to enable and disable the buck converter 16 to achieve a desired current level or intensity level in the LED load(s) 12. The buck controller 18 may then provide a switching signal SW to the buck converter 16 in accordance therewith. In some implementations, the buck controller 18 may operate with a nominal fixed duty cycle and/or may use feedback from the LED load(s) 12 (e.g., a voltage across sense resistor 24, etc.) to adjust the buck converter duty cycle. As will be appreciated, the voltage across the sense resistor 24 will be proportional to the current flowing through the LED load(s) 12, assuming the bypass switch 22 is in an "off" state. In the illustrated embodiment, feedback from the sense resistor 24 may be coupled to an error amplifier 46 that is responsive to a reference voltage \'ref to generate an error signal COMP 48 at its output, as shown. A. PWM comparator 50 may compare the error signal COMP 48 to a ramp signal to generate the SW signal for coupling to the converter switch 26, as shown. In an embodiment, the PWM comparator 50 may be enabled and disabled by the buck enable signal 40, as will be described.

The bypass switch 22 is a switch that allows current that would otherwise flow through the LED load(s) 12 to be shunted away from the load, such as to ground, thereby bypassing the LED(s) 12. The bypass controller 20 controls the bypass switch 22 so that it only turns on at appropriate times. The bypass controller 20 may be responsive to a bypass enable signal 30 that allows the bypass controller 20 to be enabled and disabled. When disabled, the bypass controller 20 keeps the bypass switch 22 in a non-conducting or "off" state. When the bypass controller 20 is enabled, it is capable of sending control signals (e.g., an LED PWM signal 38) to the bypass switch 22 at appropriate times to shunt current away from (i.e., bypass) the LED loads(s) 12. As will be described in greater detail, the bypass switch 22 may be used to adjust the light intensity of the LED load(s) 12 under certain conditions.

As shown in FIG. 1, the bypass controller 20 may be controlled by the LED driver controller 14. The LED driver controller 14 may, for example, be able to controllably enable and disable the bypass controller 20 by sending the bypass enable signal 30 to the enable input thereof. When the bypass controller 20 is enabled, the LED driver controller 14 may be able to deliver, for example, an LED pulse width modulation (PWM) signal 38 (or other signal) to an input of the bypass controller 20 that is indicative of the times when the LED load(s) 12 should be bypassed by the bypass switch 22. In the illustrated embodiment, the LED PWM signal 38 is coupled to a switch 42 that is controlled by the bypass enable signal 30 such that when the switch is closed, the LED PWM signal 38 is coupled to the control terminal of the bypass switch 22 through an inverter 44 and when the switch 42 is open, the bypass switch 22 is disabled and the LED PWM signal 38 is decoupled from the bypass switch. As will be appreciated, by controlling the intervals during which the LED load(s) are bypassed, the light intensity of the LED load(s) 12 may be adjusted.

The use of bypass switching allows large dimming duty cycles to be achieved for the LED load(s) 12. Large dimming duty cycles may be needed to achieve, for example, low light intensity levels (i.e., a high level of dimming) in the LED load(s) 12. As described previously, in some systems, it may be difficult or impossible to accurately achieve high levels of dimming using a DC-DC converter alone. Bypass switching can therefore be used as an alternative to converter-based adjustments to LED intensity. Bypass switching however, can be inefficient since it causes current to be shunted to ground. Embodiments optimize use of bypass switching techniques in order to achieve its benefits during high dimming duty cycle operation without disadvantageously affecting efficiency by using bypass techniques under any more operating conditions than necessary.

In at least one embodiment described herein, both converter-based intensity adjustments and bypass switching based intensity adjustments are implemented within a single driver system. That is, when lower dimming duty cycles (or higher light intensity levels) are desired, the system 10 may operate in a first mode and use only converter-based intensity adjustments for the LED load(s) 12. During these periods, the bypass controller 20 may be disabled. When higher dimming duty cycles (or lower light intensity levels) are desired, the system 10 may operate, in a second mode and use bypass switching techniques to adjust the intensity of the LED load(s) 12. During these periods, for example, the LED driver controller 14 may use bypass switching in addition to converter switching to adjust the intensity level of the load(s) 12 to a desired level. Because bypass switching is only used a portion of the time, overall operational efficiency is increased.

The LED driver system 10 may be a multi-mode system in some embodiments. That is, the LED driver controller 14 may have a first mode for use when lower levels of dimming are desired (i.e., higher light intensity operation) and a second mode for use when higher levels of dimming are desired (i.e., lower light intensity operation). The LED driver controller 14 may determine the level of dimming desired (or some other related parameter) and select the operational mode accordingly. In one possible approach, the LED driver controller 14 may first determine (or receive) a parameter that is related to a desired degree of dimming and then compare that parameter to a threshold to determine a present mode of operation. For example, the LED driver controller 14 may determine a desired dimming duty cycle from an input signal 32 and compare that dimming duty cycle to a duty cycle threshold. If the dimming duty cycle is below the threshold, the LED driver controller 14 may place the system 10 in the first mode in which the LED dimming is controlled by the buck converter 16 and the bypass switch 22 is disabled; whereas, if the dimming duty cycle is above the threshold, the LED driver controller 14 may place the system 10 in the second mode in which the LED dimming is controlled additionally by the bypass switch. Similarly, the LED driver controller 14 may determine whether to operate in the first or second mode based on the ON-time of the input signal 32 (i.e., ON-time/period=duty cycle of the input signal 32).

Figure 2:
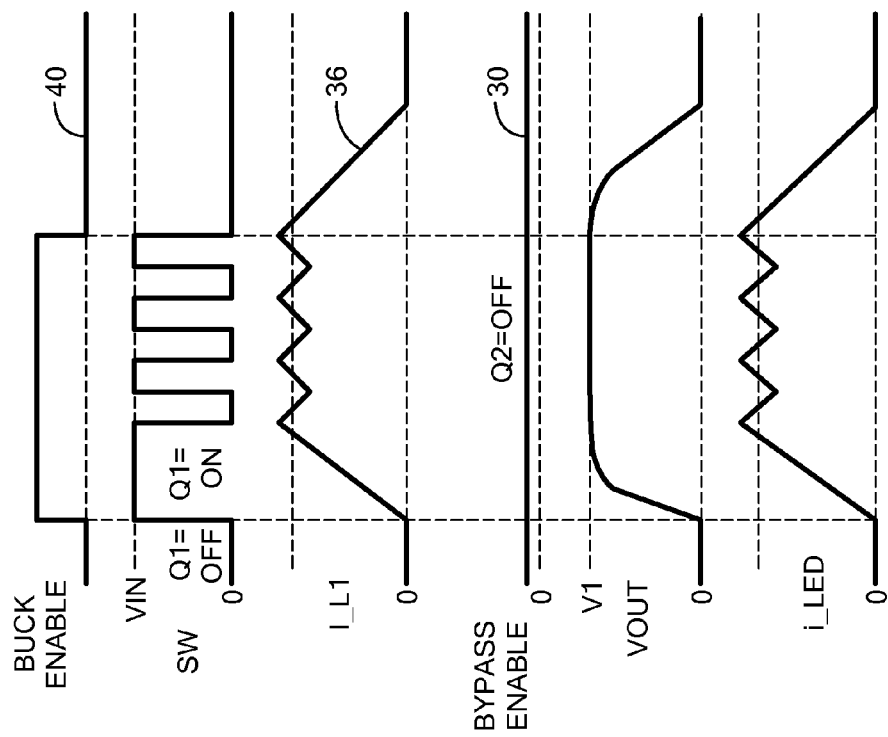
FIG. 2 shows several example waveforms associated with operation of the LED driver system of FIG. 1 in a first mode of operation.

When system 10 is operating in the first mode, the LED driver controller 14 may "disable" the bypass controller 20 and use only the buck controller 18 to set the intensity level of the LED load(s) 12. The LED driver controller 14 may, for example, send the buck enable control signal 40 indicative of a desired dimming duty cycle, current level, and/or LED intensity level to the buck controller 18 and the buck controller 18 will then generate a corresponding switching signal for the buck converter 16 to achieve the desired level. Example waveforms associated with the first mode of operation are shown in FIG. 2.

When system 10 is operating in the second mode, the LED driver controller 14 may keep the buck enable signal 40 active so that the buck converter 16 is set to a PWM duty cycle established by the feedback from the sense resistor 24. The LED driver controller 14 may also "enable" the bypass controller 20 (i.e., cause the bypass enable signal 30 to close the switch 42) and deliver the LED PWM signal 38 to an input thereof that is indicative of the manner in which the bypass controller 20 is to control the bypass switch 22 to achieve the desired dimming level. For example, the LED PWM signal 38 may include a logic one for time intervals when the bypass switch 22 is to be "off" and a logic zero for time intervals when the bypass switch 22 is to be "on" (i.e., bypassing), or vice versa. The bypass controller 20 may then use the PWM LED signal 38 received from the LED driver controller 14 to generate a control signal for the bypass switch 22.

In some embodiments, the LED driver controller 14 may implement hysteresis in comparing the parameter to the threshold. For example, in an embodiment, if the input signal 32 indicates a dimming duty cycle of less than the threshold (e.g., that would require a buck converter switch on-time of greater than 120 μsec), then the first mode of operation may be entered; however, once in the first mode, the second mode of operation may not be entered until the input signal 32 indicates a dimming duty cycle of some amount less than the threshold (e.g., a dimming duty cycle that would require a buck converter switch on time of less than 100 μsec).

In some embodiments, the bypass controller 20 may not have an enable input 30. For example, in some embodiments, the LED driver controller 14 may send a control signal to the so signal input of the bypass controller 20 during second mode operation and no signal to the signal input of the bypass controller 20 during first mode operation. In some embodiments, bypass controller 20 may be part of LED driver controller 14. Other control techniques may alternatively be used.

Although illustrated as a single transistor, any type of switch that is capable of achieving the required switching speed may be used as bypass switch 22. This may include both electronic switches and mechanical switches. Any of a wide variety of different transistor types may be used for bypass switch 22. In addition, multiple transistor architectures may be used in some implementations.

In some embodiments, some or all of the components of the LED driver system 10 may be implemented within one or more integrated circuits (ICs) or multi-chip modules (e.g., a driver IC, etc.). For example, in some embodiments, any combination of the LED driver controller 14, the buck controller 18, the bypass controller 20, the bypass switch 22, and the sense resistor 24 may be implemented within a common LED driver IC. The buck converter 16 may be implemented either inside or outside the IC. In at least one embodiment, the buck converter 16 is implemented outside the IC using, for example, discrete components. In other embodiments, all components are implemented separately and coupled together to form the LED driver system 10. Other arrangements, including arrangements that utilize multiple ICs and arrangements that utilize only discrete components, may alternatively be used.

In at least one embodiment, the LED driver system 10 may include one or more digital processing devices. For example, one or more digital processing devices may be used to implement the LED driver controller 14 in some implementations. The digital processing device(s) may include, for example, a general purpose microprocessor, a digital signal processor, a reduced instruction set computer (RISC), a complex instruction set computer (CISC), a field programmable gate array (FPGA), a programmable logic array (PLA), a microcontroller, an embedded processor, an application specific integrated circuit (ASIC), and/or others, including combinations of the above. In some embodiments, the LED driver controller 14 may be user-programmable or user-configurable to achieve, for example, a desired illumination pattern or profile. The LED driver controller 14 may include an input to receive input 32 from, for example, a user or another controller or processor.

As described above, the LED driver system 10 of FIG. 1 includes a buck converter 16. It should be appreciated, however, that other types of DC-DC switching converters (e.g., Forward converters, Half Bridge converters, Full Bridge converters, Push-Pull converters, etc.) may alternatively be used, although some types of converters may require modification to achieve the desired operational properties. A buck converter 16 works well in the architecture of FIG. 1 because the same current flows through the LED load(s) 12 that flows through the inductor 34 of the buck converter 16. The current from the inductor 34 is then shunted directly to ground (or another reference potential) when the bypass switch 22 is activated.

Referring also to FIG. 2, waveforms associated with the system 10 of FIG. 1 in the first mode of operation include the buck enable signal 40, the SW signal coupled to the buck converter switch 26 (referred to as Q1 in FIG. 2), the output inductor current 136, the bypass enable signal 30, the output voltage $V_{OUT}$ 28, and the current through the LED load i_LED. Like illustrative waveforms are shown in FIG. 3 when the driver system 10 is operating in the second mode of operation.

In the first mode of operation as illustrated in FIG. 2, bypass switching is disabled, as is here achieved by the bypass enable control signal 30 coupled to the switch 42 being low. The buck converter 16 is enabled when the buck enable signal 40 is high, during which time the converter switch 26 operates in accordance with the control signal SW to set the buck converter duty cycle based on feedback from the converter output. Thus, during this time, the current through inductor 34 ramps up to a level necessary to drive the LED load 12 at the desired intensity and the output voltage increases to a level Vf. As is apparent, the current through the inductor i_LED takes time to ramp up and down. Since the bypass switching is disabled during this first mode of operation (i.e., switch 22 referred to as Q2 in FIG. 2 is off), the current through the inductor 34 flows through the LED load (so, the inductor current 36 is the same as the LED current i_LED).

Figure 3:
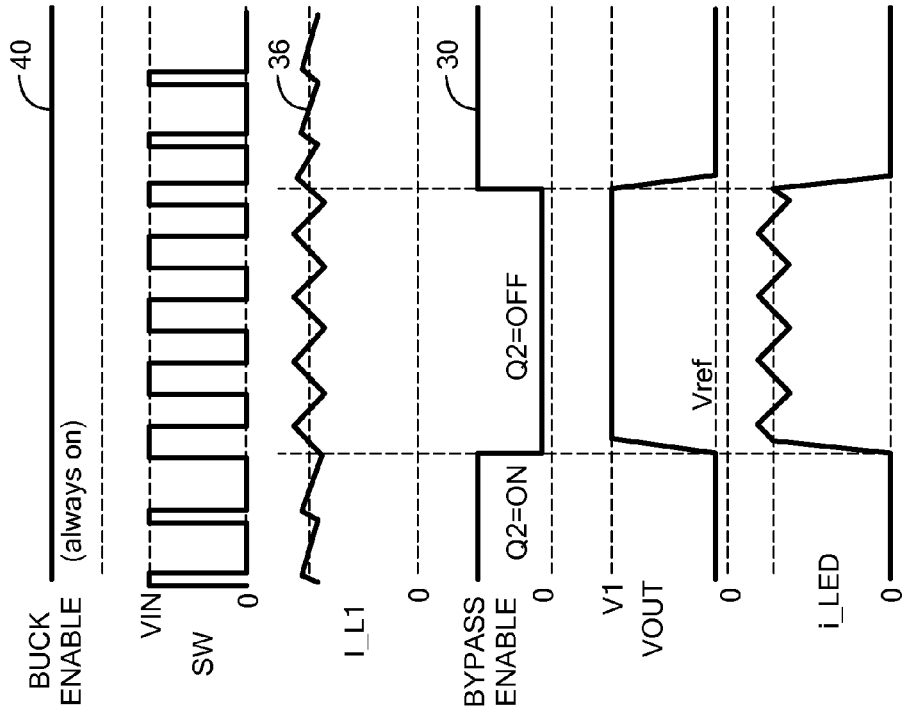
FIG. 3 shows several example waveforms associated with operation of the LED driver system of FIG. 1 in a second mode of operation.

In the second mode of operation as illustrated in FIG. 3, bypass switching is enabled when the bypass enable signal 30 is high (e.g., thereby closing switch 42, FIG. 1). During these times, the PWM LED signal 38 is inverted by inverter 44 and coupled to the control terminal of the bypass switch 22 to turn the bypass switch on and off as necessary to achieve the desired LED dimming. Also during the second mode of operation, the buck converter 16 remains on (as may be achieved by keeping the buck enable signal 40 high). Thus, even during times when the bypass enable signal 30 is high (and the bypass switch is on), the converter switch 26 is switching. With this arrangement, the average inductor current 36 remains substantially constant during LED dimming and the current through the LED load i_LED ramps up and down more quickly than in the first mode of operation.

Figure 4:
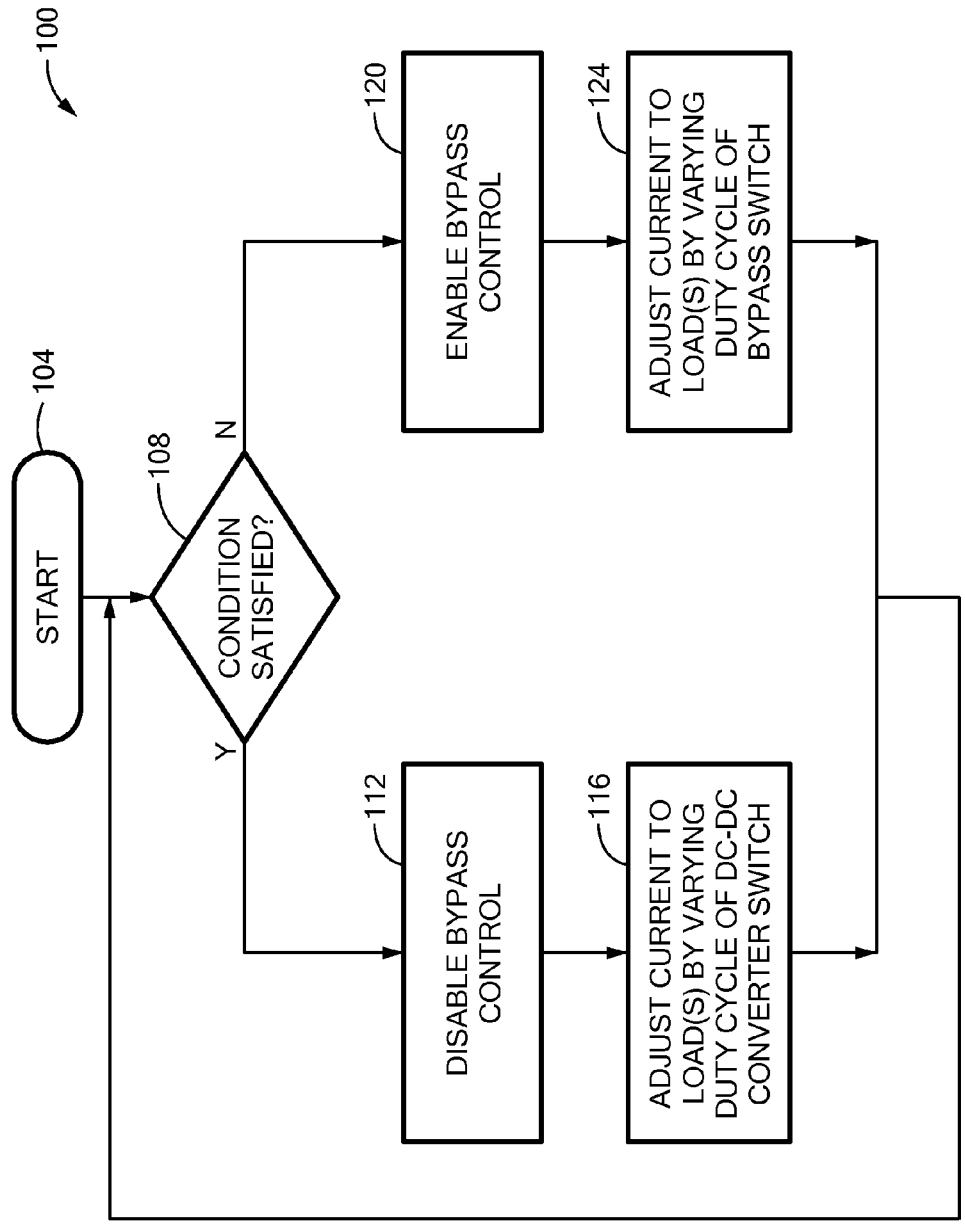
FIG. 4 is a flow chart illustrating a method for operating an LED driver system that includes a DC-DC converter and LED bypass circuitry in accordance with an embodiment.

FIG. 4 is a flow diagram illustrating a method 100 for operating a driver system that includes a DC-DC converter (e.g., a buck current regulating converter or other type of switching, current regulating converter) and load bypass circuitry (such as, e.g., system 10 of FIG. 1) in accordance with an embodiment. In the discussion below, the method 100 will be described in the context of an LED driver system. However, the techniques described may also be implemented in connection with other types of driver systems and load types.

The rectangular elements in FIG. 4 (typified by element 108) are herein denoted "processing blocks" and may represent computer software instructions or groups of instructions. It should be noted that the flow diagram of FIG. 4 represents one exemplary embodiment of the design described herein and variations in such a diagram, which generally follow the process outlined, are considered to be within the scope of the concepts, systems, and techniques described and claimed herein.

Alternatively, the processing blocks may represent operations performed by functionally equivalent circuits such as a digital signal processor (DSP) circuit, an application specific integrated circuit (ASIC), or a field programmable gate array (FPGA). Some processing blocks may be manually performed while other processing blocks may be performed by a processor or other circuitry. The flow diagram does not depict the syntax of any particular programming language. Rather, the flow diagram illustrates the functional information one of ordinary skill in the art may require to fabricate circuits and/or to generate computer software to perform the processing of the particular apparatus. It should be noted that many routine program elements, such as initialization of loops and variables and the use of temporary variables may not be shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIG. 4 can be performed in any convenient or desirable order.

Referring now to FIG. 4, a driver system may first determine whether a predetermined condition is satisfied (block 108). As is described below, the predetermined condition may be used to determine the operational mode of the driver system. In an LED driver system, the predetermined condition may include a currently desired (or commanded) brightness of the LED load(s) exceeding a predetermined threshold. If the currently desired brightness of the LED load(s) exceeds the predetermined threshold, a first operational mode may be entered. Otherwise, a second operational mode may be entered. Other conditions may alternatively be used.

With reference to FIG. 4, if the predetermined condition is satisfied, the LED driver system may be placed within a first mode of operation (block 112). During the first mode of operation, all bypass control functions may be suspended. This may be accomplished by, for example, disabling a bypass controller (e.g., with the bypass enable signal 30) or by simply sending the signal to a bypass switch 22 that keeps the bypass switch "off" for the duration of operation within the first mode. The current of the LED load(s) may then be adjusted by adjusting the PWM buck converter duty cycle of the DC-DC converter (block 116).

If the predetermined condition is not satisfied, the LED driver system may be placed within a second mode of operation (block 120). During the second mode of operation, the buck converter may be kept on (i.e., the switch 26 may be toggled on and off according to a duty cycle established by the feedback from the sense resistor). Bypass control may then be used to adjust the current through the LED load(s) (block 124). In some embodiments, this may involve, for example, enabling a bypass controller (e.g., with the bypass enable signal 30) and sending a control signal (e.g., LED PWM signal 38) to the bypass controller 20 that is indicative of the way in which a bypass switch is to be switched to achieve the desired dimming duty cycle. The bypass controller may then generate a control signal for the bypass switch based thereon. Other techniques may alternatively be used to perform the bypass control. The LED driver system may continually monitor a desired LED brightness level and adjust the mode of operation accordingly.

The techniques, systems, circuits, and concepts described herein have been described in the context of LED driver circuits. However, it should be appreciated that these techniques, systems, circuits, and concepts are not limited to use with LED driver applications. On the contrary, these concepts may be used with other types of loads, as persons of ordinary skill in the art will readily understand.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A driver circuit for driving one or more loads in a controlled manner, the driver circuit comprising: a multi-mode controller to control operation of the driver circuit, the multi-mode controller being capable of operating the driver circuit in a first mode or a second mode based on a parameter value, wherein operation under the first mode includes using a DC-DC converter to adjust a drive signal applied to the one or more loads in response to a DC-DC converter enable signal and operation under the second mode includes using bypass switching to adjust the drive signal applied to the one or more loads, wherein bypass switching includes controllably shunting drive current to a reference node in a manner that bypasses the one or more loads; at least one node for coupling to the one or more loads during driver operation; a bypass switch coupled to the at least one node for use in bypass switching, the bypass switch having an input to receive a switching control signal; and a bypass controller coupled to the input of the bypass switch, the bypass controller to generate the switching control signal for the bypass switch if the driver circuit is in the second mode; wherein the bypass controller includes an enable input for use in enabling and disabling the bypass controller, wherein the multi-mode controller is configured to disable the bypass controller if the driver circuit is in the first mode.

2. The driver circuit of claim 1, further comprising:
a DC-DC converter controller to control a duty cycle of the DC-DC converter based, at least in part, on the DC-DC converter enable signal from the multi-mode controller.

3. The driver circuit of claim 2, wherein:
the DC-DC converter controller is configured to control the duty cycle of the DC-DC switching converter based, at least in part, on the DC-DC converter enable signal from the multi-mode controller and feedback from the one or more load devices.

4. The driver circuit of claim 3, further comprising:
a sense resistor for coupling between the one or more loads and a reference potential during driver operation, the sense resistor being coupled to an input of the DC-DC converter controller to provide feedback thereto for use in adjusting the duty cycle of the DC-DC converter.

5. The driver circuit of claim 1, wherein:
the DC-DC converter is a buck converter.

6. The driver circuit of claim 3, wherein:
the driver circuit includes a light emitting diode (LED) driver circuit and the one or more loads include LEDs.

7. The driver circuit of claim 6, wherein:
the parameter value includes a desired brightness for the one or more LEDs and the multi-mode controller is configured to operate the driver circuit in the first mode if the desired brightness is above a threshold level and in the second mode if the desired brightness is below the threshold level.

8. The driver circuit of claim 7, wherein:
the multi-mode controller is configured to adjust the brightness of the one or more LEDs by adjusting a duty cycle of the DC-DC converter if the driver circuit is in the first mode and by turning the bypass switch on and off if the driver circuit is in the second mode.

9. A method for operating a driver circuit for driving one or more loads in a controlled manner, comprising:
operating the driver circuit in a first mode if a first condition is satisfied, wherein the first mode includes adjusting a drive signal applied to the one or more loads by varying a duty cycle associated with a DC-DC converter in response to a DC-DC converter enable signal and disabling a bypass controller; and
operating the driver circuit in a second mode if the first condition is not satisfied, wherein the second mode includes adjusting the drive signal applied to the one or more loads using bypass switching, wherein bypass switching includes controllably shunting drive current away from the one or more loads, wherein bypass switching is not used when the driver circuit is being operated in the first mode.

10. The method of claim 9, wherein:
the first condition includes a desired output characteristic of the one or more loads being greater than a threshold value.

11. The method of claim 9, wherein:
the one or more loads include light emitting diodes; and
the first condition includes a desired brightness of the one or more loads being greater than a threshold value.

12. A light emitting diode (LED) driver circuit to drive one or more LED loads in a controlled manner, the LED driver circuit comprising:
a DC-DC converter controller to control a duty cycle of a DC-DC converter to be coupled to the one or more LED loads in response to a DC-DC converter enable signal;
a bypass switch to controllably shunt drive current to a reference node in a manner that bypasses the one or more LED loads, the bypass switch having an input to receive a switching control signal;
a bypass controller coupled to the input of the bypass switch to generate the switching control signal; and
a multi-mode controller to control operation of the LED driver circuit, the multi-mode controller to operate the LED driver circuit in accordance with a first mode when a desired light intensity of the one or more LED loads is greater than a threshold value and to operate the LED driver circuit in accordance with a second mode when the desired light intensity of the one or more LED loads is less than the threshold value, wherein the second mode uses the bypass switch to adjust a drive signal applied to the one or more LED loads and the first mode does not, wherein the bypass controller is configured to generate the switching control signal for the bypass switch when the LED driver circuit is in the second mode and the bypass controller is disabled when the LED driver circuit is in the first mode.

13. The LED driver circuit of claim 12, wherein:
the DC-DC converter includes a buck converter and the DC-DC converter controller includes a buck controller.

14. The LED driver circuit of claim 12, further comprising:
a sense resistor to be coupled between the one or more LED loads and a node carrying a reference potential during LED driver operation, the sense resistor being coupled to an input of the DC-DC converter controller to provide feedback to the controller for use in controlling the duty cycle of the DC-DC converter.

* * * * *

UNITED STATES PATENT AND TRADEMARK OFFICE
CERTIFICATE OF CORRECTION

PATENT NO. : 9,538,601 B1
APPLICATION NO. : 14/878274
DATED : January 3, 2017
INVENTOR(S) : Mangtani et al.

Page 1 of 1

It is certified that error appears in the above-identified patent and that said Letters Patent is hereby corrected as shown below:

In the Specification

Column 5, Line 35 delete "\'ref" and replace with --Vref--.

Column 5, Line 36 delete "A. PWM comparator" and replace with --A PWM comparator--.

Column 6, Line 65 delete "system. 10" and replace with --system 10--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*